(12) United States Patent
Liu et al.

(10) Patent No.: US 7,657,131 B2
(45) Date of Patent: Feb. 2, 2010

(54) SYSTEMS AND METHODS FOR INTEGRATED OPTICAL CIRCUITRY FOR HIGH DATA RATE OPTICAL TRANSMISSION AND RECEPTION

(75) Inventors: Ansheng Liu, Cupertino, CA (US); Hat D. Nguyen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 11/823,659

(22) Filed: Jun. 28, 2007

(65) Prior Publication Data

US 2009/0003755 A1 Jan. 1, 2009

(51) Int. Cl.
*G02F 1/295* (2006.01)

(52) U.S. Cl. .............................................. 385/9; 385/4

(58) Field of Classification Search ...................... 385/9, 385/4

See application file for complete search history.

(56) References Cited

U.S. PATENT DOCUMENTS

| | | | | |
|---|---|---|---|---|
| 4,706,103 A | * | 11/1987 | Ranganath | .................. 359/321 |
| 6,031,243 A | * | 2/2000 | Taylor | .......................... 257/13 |
| 6,479,844 B2 | * | 11/2002 | Taylor | .......................... 257/192 |
| RE38,682 E | * | 1/2005 | Taylor | ..................... 372/50.11 |
| 2002/0121647 A1 | * | 9/2002 | Taylor | .......................... 257/192 |
| 2005/0121663 A1 | * | 6/2005 | Taylor | .......................... 257/24 |
| 2008/0181551 A1 | * | 7/2008 | Wang et al. | .................... 385/2 |

\* cited by examiner

*Primary Examiner*—K. Cyrus Kianni
(74) *Attorney, Agent, or Firm*—Schubert Osterrieder & Nickelson PLLC; Jeffrey S. Schubert

(57) ABSTRACT

Embodiments include systems and methods for integrated circuitry optical modulation. In one embodiment, an integrated circuit comprises an optical waveguide enabling multi-level modulation. The embodiment comprises an optical waveguide with integrated circuit modulators. An optical waveguide is split into at least two branches so that modulation can be imposed in each branch. In one embodiment, the branches are combined to produce an optical signal path in which additional modulation is imposed. In an embodiment of an integrated circuit optical demodulator, a received modulated optical signal is divided into branches and demodulated. Embodiments provide a single integrated circuit for multi-level modulation, thereby avoiding the disadvantages of modulation using separate discrete components. Also, a single integrated circuit for multi-level demodulation is provided.

8 Claims, 3 Drawing Sheets

MZM - Mach-Zehnder modulator
PM - Phase Modulator
π/2 - phase shift of π/2 between the two arms

SYSTEMS AND METHODS FOR INTEGRATED OPTICAL CIRCUITRY FOR HIGH DATA RATE OPTICAL TRANSMISSION AND RECEPTION

FIELD

The present invention is in the field of optical communications and integrated optics. More particularly, the invention is in the field of photonic integrated circuit for modulation and demodulation of optical signals.

BACKGROUND

High speed computing has become increasingly prevalent in recent years. Networks of computers have become ubiquitous. With the advent of networks of computers there is a growing need for high speed, high bandwidth Ethernet and optical fiber cables between computers and servers. It follows that there is a need for the ability to modulate data at high speed and high bandwidth to apply to the high speed, high bandwidth interconnecting cables. Because of the extremely high bandwidth at optical frequencies, much effort has been placed into development of optical communications using high-coherency laser sources. The effort is directed toward modulating the lightwave output of a laser at high data rates and to impart the modulated lightwave onto an optical fiber cable.

Because of the high bandwidth available when using optical laser sources, for standard binary modulation (on-off keying) of a laser source, the data transmission capacity per laser wavelength is limited by the optical modulation speed. For both directly modulated lasers and externally modulated lasers using optical modulators, the available modulation speed is currently not high enough to meet the requirement for the high-capacity data transmission of 1-10 Tb/s (for many-core or tera-scale computing) as well as low-cost 100 Gb/s Ethernet applications (next generation of the Ethernet).

Multilevel signaling can be used to increase spectral efficiency, i.e. to increase the data transmission rate for a single carrier frequency. There are a number of schemes that can be used, including M-ary pulse amplitude modulation (M-PAM) and multilevel differential phase shift keying (DPSK). While M-PAM is simple to implement optically, it suffers a severe signal-to-noise ratio (SNR) penalty. The SNR is directly related to the bit error rate of the link. For example, for 4-PAM (2×), 8-PAM (3×), and 16-PAM (4× bandwidth increase), the corresponding penalties are 5.5, 10.7, and 15.9 dB as compared to binary on-off keying.

In contrast, the DPSK modulation scheme has a much smaller SNR penalty, while increasing the spectral efficiency. For 8-level DPSK, for instance, the SNR penalty is on the order of 3 dB. In addition, DPSK has greater tolerance to transmission impairments. Despite these advantages, the optical implementation of DPSK is more complicated. Previously, discrete modulators, phase shifters, fiber Mach-Zehnder delayed interferometers (MZDIs), and detectors were used. The discrete component approach not only poses technical challenges, but also is bulky and costly.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for integrated circuitry optical modulation. In one embodiment, an integrated circuit comprises an optical waveguide enabling multi-level modulation. The embodiment comprises an optical waveguide with integrated circuit modulators. An optical waveguide is split into at least two branches so that modulation can be imposed in each branch. In one embodiment, the branches are combined to produce an optical signal path in which additional modulation is imposed. In an embodiment of an integrated circuit optical demodulator, a received modulated optical signal is divided into branches and demodulated. Embodiments provide a single integrated circuit for multi-level modulation, thereby avoiding the disadvantages of modulation using separate discrete components. Also, a single integrated circuit for multi-level demodulation is provided.

The communication systems described herein are intended to represent any of a wide variety of communication systems including communication systems for communication between computers and between computers and servers and repeaters.

Embodiments provide an integrated silicon modulator, with silicon MZDIs, and Silicon-Germanium (SiGe) detectors on a single silicon substrate to provide a low-cost high spectral efficiency module. Embodiments can be used for 100 Giga bit per second (Gb/s) Ethernet and 1-10 Tera bit per second (Tb/s) data transmission for future tera-scale computing. Because the silicon modulator is based on depletion width modulation in a reverse biased pn junction with traveling-wave electrode design, embodiments are capable of encoding data at a speed of at least about 40 Gb/s, using 8-DPSK and are able to transmit data at a speed of at least about 120 Gb/s with a single laser wavelength.

Figure 1:
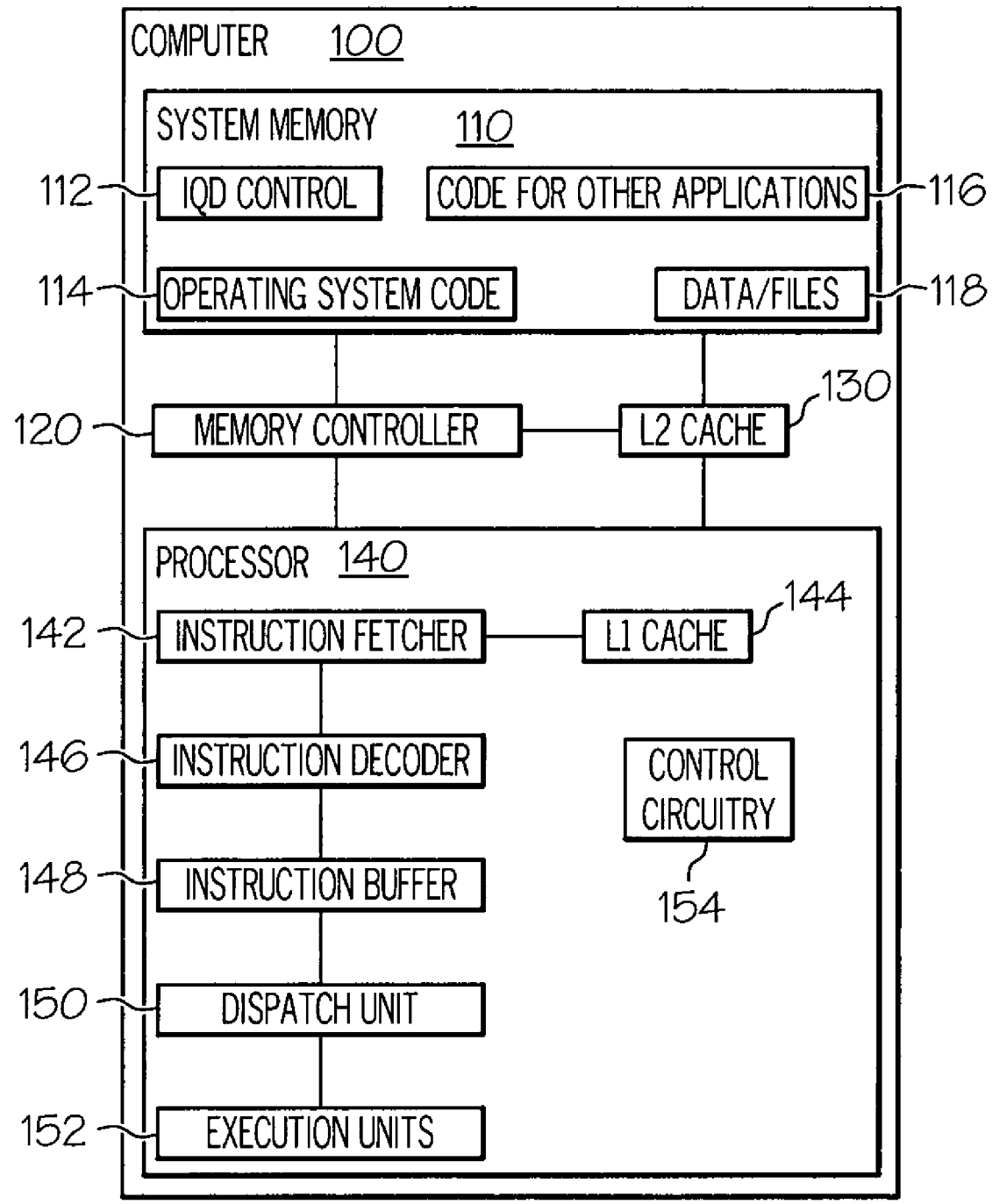
FIG. 1 depicts an embodiment of a computer that communicates in a network by way of optical communications.
Figure 1A:
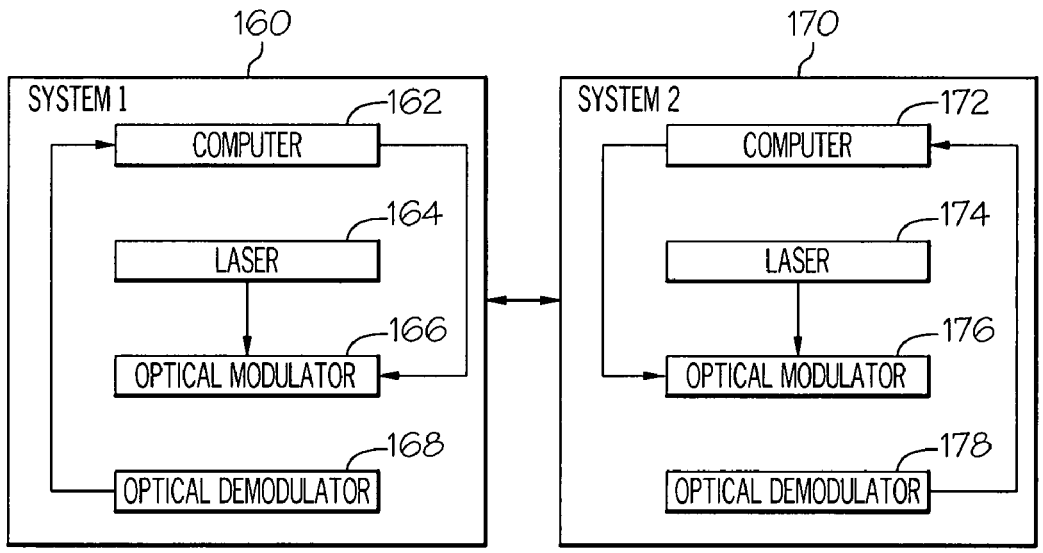
FIG. 1A depicts two computer systems that communicate by way of optical modulated signals.

FIG. 1A shows a computer communications system comprising at least two computing systems 160 and 170. Each system comprises a computer 162, 172, a laser 164, 174, an optical modulator 166, 176 and an optical demodulator 168, 178. Each system is able to communicate with the other through an optical link. Typically, an optical fiber may carry signals from system 1 to system 2 and vice versa. A system may be, for example, a desktop computer or workstation or server or other device needing to communicate with another system. Although not shown in FIG. 1A, the systems may be connected through optical fibers by a repeater which receives a signal from a transmitting system and amplifies and repeats it to the receiving system.

In operation, one computer, say computer 162, will generate data that needs to be communicated to another computer 172. The data to be transmitted to computer 172 is sent to optical modulator 166. Optical modulator 166 modulates the data onto a lightwave produced by laser 164. The modulated lightwave is transferred by an optical fiber to optical demodulator 178 of system 170. Demodulator 178 receives the modulated lightwave and demodulates it to extract the data there from. Demodulator 178 then transfers the data to computer 172 or to system memory (not shown). Similarly, when data is to be transferred from system 170 to system 160, data is transferred from computer 172 to optical modulator 176. Optical modulator 176 modulates a lightwave from laser 174 and transmits the modulated lightwave to an optical fiber connected to optical demodulator 168 of system 160. Optical demodulator 168 demodulates the light wave to extract the data, and then transfers the data to computer 162 or to system memory (not shown).

In one embodiment, a computer of a system is programmed to provide data in multiple data streams for modulation onto a lightwave. Thus, for example, computer 162 will provide three data streams, denoted I, Q, and D, to optical modulator 166. Optical modulator is a single integrated circuit device that receives each data stream at a different point in the integrated circuit and performs three separate modulations of the lightwave provided by laser 164. This produces 8 level DPSK modulation of the lightwave. In one embodiment, two modulation functions, namely amplitude and phase modulations, are performed in parallel, and these two modulated lightwave signals are combined and then further modulated.

Also, in one embodiment, optical demodulator 178 is a single integrated circuit to perform optical demodulation of a modulated optical signal. The demodulator receives the light wave signal and splits it into 4 branches. Each branch is input to a MZDI which creates a time delay of 1/B, B being the bit rate, and phase shift by a different integer multiple of pi/8. The two outputs from each MZDI that comprise detectors to produce electrical signals that are summed to reconstruct the I, D, and Q signal data streams. The operations of the modulator and demodulator are discussed more fully below.

FIG. 1 shows view of a computer 100 of a host system such as host system 160 or 170 use in communicating data optically. Computer 100 comprises a system memory 110, a memory controller 120, an L2 cache 130, and a processor 140. System memory 110 comprises a hard disk drive memory, Read-Only Memory (ROM), and Random Access Memory (RAM). System memory 110 IQD control software 112, Operating System (OS) code 114, Basic Input-Output System (BIOS) code (not shown), and code for other application programs 116. System memory 110 also stores data and files 118. The IQD 112, OS code 114, and applications code 116, are typically stored on a hard drive, whereas BIOS code is typically stored in ROM. In one embodiment, IQD software enables the computer to submit three data streams, denoted I, Q, and D, to the modulator for modulation and to receive three data streams from the demodulator. This enables eight level DPSK modulation, as will be explained more fully below.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level 1 cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 120 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1 also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

Figure 2:
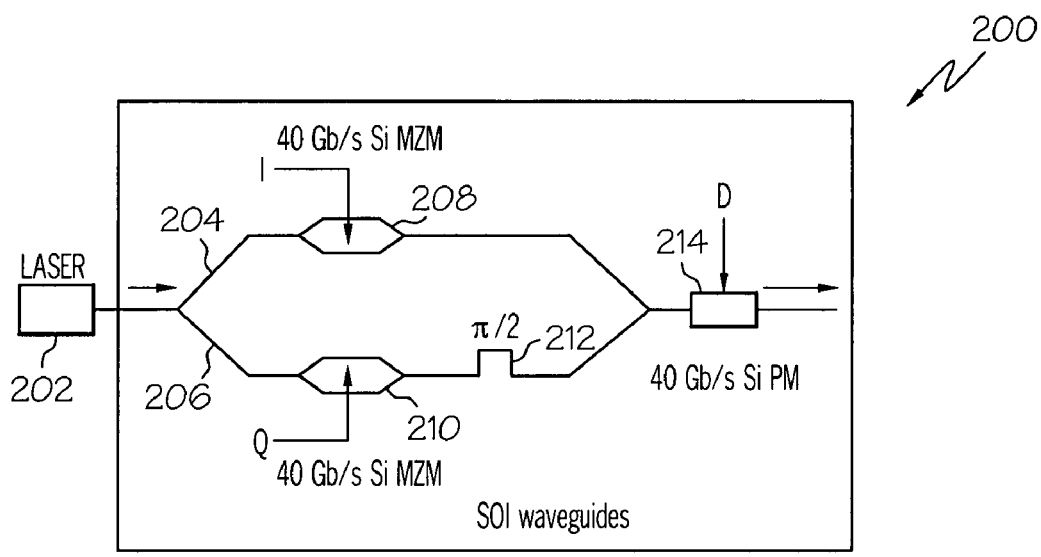
FIG. 2 depicts a transmitter for modulating an optical signal.

FIG. 2 shows a diagram of an 8 level DPSK modulator 200. In Differential Phase-Shift Keying, (DPSK), the modulator 200 maps blocks of data into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta_n=2\pi(n-1)/N$ for n a positive integer less than or equal to N. A resulting equivalent low pass signal may be represented as $$u(t) = \sum_{n=1}^{\infty} e^{j\theta_n} g(t-nT)$$

where g(t–nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference. Persons of skill in the art will recognize that the mathematical equations discussed herein are illustrative, and that different mathematical forms may be used to represent the pertinent signals.

Thus, FIG. 2 shows a schematic of an 8-level DPSK transmitter 200 consisting of two silicon amplitude Mach-Zehnder modulators (MZMs) and one phase modulator (PM). Three differentially encoded input electrical signals (I, Q, and D) at a bit rate of 40 Gb/s are used to drive the two MZMs and one PM. At the output of the transmitter, 8 possible phase shifts (npi/4, n=0, 1, . . . 7) between successive bits are generated. Each phase shift represents one set of bits for I, Q, and D. Therefore, the total bit rate of the transmitter is 3 times the individual modulator modulation rate. The entire transmitter chip is on a single silicon-on-insulator (SOI) substrate except for the CW (Continuous Wave) laser.

In operation, a continuous light wave is received into an optical waveguide formed in the integrated circuit from a continuous wave laser 202. The integrated circuit optical waveguide splits into two branches 204 and 206. Thus, an unmodulated lightwave enters each branch. In each branch is an MZM (Mach-Zehnder Modulator) 208, 210. MZM 208 receives one electrical signal data stream denoted I and MZM 210 receives another electrical signal data stream denoted Q. A data stream I or Q is a signal with binary data impressed thereon. In one embodiment, a data stream I may comprise data at a rate of at least about 40 Giga bits per second. (Gb/s). Similarly, data stream Q may also comprise data at a rate of at least about 40 Gb/s.

In an MZM device, when the data of the applied data stream is a logical high, the optical signals in each branch of the MZM join by constructive interference to produce a lightwave, whereas, when the applied data stream is a logical low, the optical signals in each branch of the MZM join by destructive interference to extinguish the lightwave. Thus, the optical signal output by an MZM is a lightwave modulated at the data stream rate. Thus, the output of MZM 208 is modulated according to the I data stream and the output of MZM 210 is modulated according to the Q data stream. In one branch leading from MZM 210 is a pi/2 phase shifter that makes that branch $\lambda/4n_{eff}$ ($\lambda$ is the light wavelength and $n_{eff}$ is the effective refractive index of the waveguide) optically longer or shorter than the other branch so that the signals are orthogonal and can therefore be differentiated in a demodulator. The signals are then combined into one optical signal modulated at a rate that is the sum of the modulation rate in each branch.

The combined modulated optical signal combined from the two branches 204 and 206 are input into a phase modulator 214. Phase modulator 214 receives an electrical signal data stream denoted D. When the data of the applied data stream D is a logical high, the phase of the optical signal propagating through phase modulator 214 is changed, whereas when the data of the applied data stream D is a logical low, the phase of the optical signal propagating through phase modulator 214 is not changed. In one embodiment, the modulation rate impressed by data stream D is at least about 40 Gb/s. Thus, the output of phase modulator 214 is modulated according to the data streams I, Q, and D. The modulation rate of the output of phase modulator 214 is the sum of the modulation rates imposed by the three data streams. Thus, in one embodiment, the output of phase modulator 214 is an optical signal modulated at a rate of at least about 120 Gb/s. This optical modulated signal is output to an optical fiber that connects computers in a network. Note that in an alternative embodiment, phase modulator 214 may be placed before branches 204 and 206, rather than after them.

Figure 3:
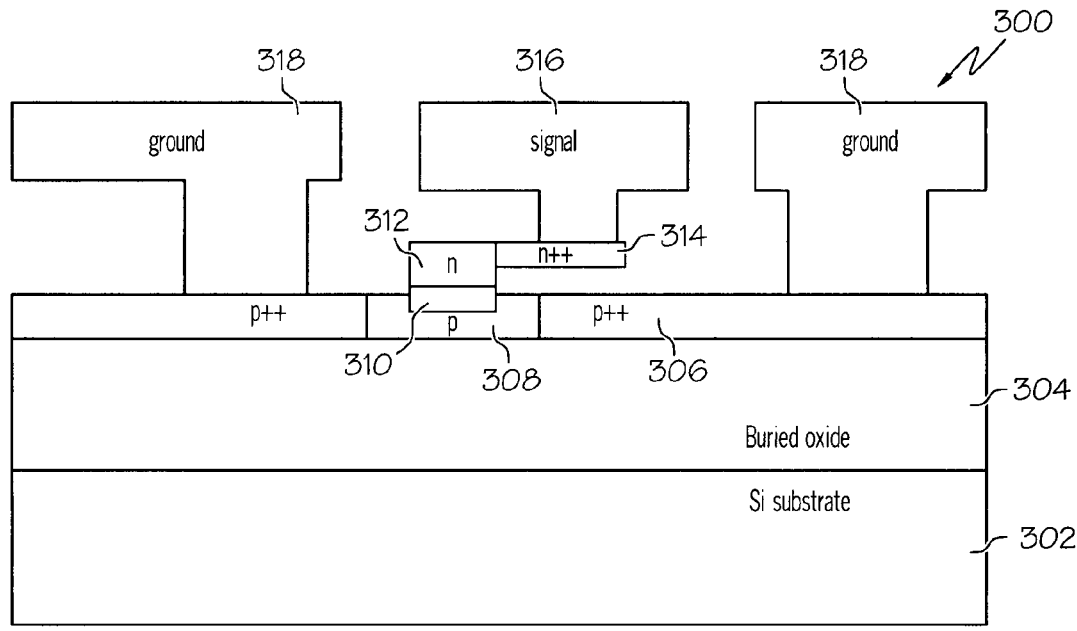
FIG. 3 depicts a pn diode phase modulator on silicon-on-insulator substrate with coplanar waveguide electrodes.

FIG. 3 shows a cross section 300 of a segment of an embodiment of an integrated circuit for an optical modulator such as the modulator of FIG. 2. The drawing of FIG. 3 is not to scale. First note that the entire structure of the modulator (demodulator) as described herein can be formed upon a single substrate to form an integrated circuit to perform multi-level modulation (demodulation). Thus, in the embodiment of FIG. 3, the integrated circuit modulator (demodulator) is formed upon a single silicon (Si) substrate 302. Above the silicon substrate is a buried oxide layer 304. Above the buried oxide layer are the active constructs which form an optical waveguide where which an optical signal may be modulated by an electrical signal.

Above buried oxide layer 304 is a heavily doped p++ layer 306. Etched into this p++ layer is a channel in which is deposited a more lightly doped p layer 308. Above the p layer 308 is deposited an n layer 312, thereby forming a pn junction and an optical waveguide. Between the p layer and the n layer forms a depletion region 310. Above the n layer 312 is a more heavily doped n++ layer 314. Above the n++ layer is a metallic layer 316. To the left and right of this construct, above the p++ layer are metallic layers 318 for ground. A modulating signal is applied to metallic construct 316. When the modulating signal applied to the metallic construct 316 goes negative, the pn junction is forward biased, and the depletion region decreases. When the forward biased voltage is high enough, the depletion region disappears and the current flows cross the pn junction. This induces the phase shift of the optical signal in the optical waveguide because it decreases the index of refraction of the waveguide medium via the free carrier plasma dispersion effect. Conversely, when the modulating signal goes positive, the pn junction is reverse biased and the depletion region increases. This increases the index of refraction of the silicon waveguide and in turn changes the phase shift of the optical signal traveling there through. Thus, the optical signal traveling in the optical waveguide can be phase modulated by an electrical signal applied to metallic construct 316.

Thus, one embodiment comprises an integrated circuit for modulating a continuous wave laser. The embodiment comprises a substrate upon which is constructed a pn junction with a depletion region there between to form an optical waveguide. A splitter construct over the substrate splits the optical waveguide into at least two branches. In each branch there is a metallic construct over the substrate. The metallic construct is coupled to the pn junction to modulate optical energy of the laser coupled into the optical waveguide according to an electrical modulating signal comprising data to be transmitted applied to the metallic construct. In some embodiments, one branch exhibits a pi/2 phase shift with an optical path length longer or short than the other branch. In some embodiments the signal in at least one branch is modulated at a rate of at least about 40 Giga bits per second. Some embodiments further comprise a combiner construct over the substrate to combine the modulated optical signals from each branch into a single optical waveguide path. In some embodiments, the combined signal exhibits a modulation rate of at least about 80 Giga bits per second.

The integrated circuit may further comprise an additional level of modulation in the single path where the modulated signals have been combined. Thus, embodiments may comprise a metallic construct over the substrate coupled to a pn junction forming an optical waveguide in the single path to modulate optical phase according to an electrical modulating signal comprising data to be transmitted applied to the metallic construct over the substrate in the single path. The metallic construct over the substrate in the single path may be continuous with the metallic constructs over the substrate in the branches. With this additional level of modulation, the combined signal after modulation in the single path may exhibit a modulation rate of at least about 120 Giga bits per second. In some embodiments, before the splitter construct, a metallic construct may be placed over the substrate to modulate optical energy of the laser according to an electrical modulating signal comprising data to be transmitted applied to the metallic construct before the signal is split into the two branches.

Figure 4:
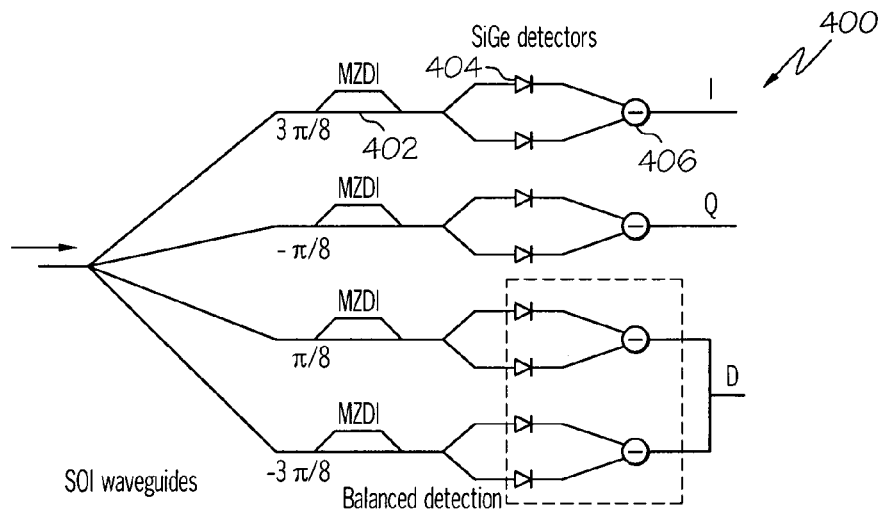
FIG. 4 depicts a receiver for demodulating a modulated optical signal.

FIG. 4 shows a schematic of an 8-level DPSK receiver 400 consisting of a silicon based 1×4 splitter, 4 MZDIs, and 8 SiGe (silicon-germanium) photo-detectors (with balanced detection). As a key component in the receiver, the MZDI has a build-in optical path length difference to produce a time delay of 25 ps (pico-seconds) (or 1/B, B being the bit rate) between the two arms. By using silicon waveguides, for example, one needs an optical path length difference of ~2.2 mm to achieve 25 ps time delay. This is more than 2 times smaller than that for fiber based MZDI. Also, the MZDIs have a phase shift of 3pi/8, −pi/8, pi/8, and −3pi/8 between the two arms, respectively. With these phase shifts, the input signals of I, Q, and D can be recovered through the balanced detection circuits.

A received modulated optical signal is split into four branches. In each branch is a Mach-Zehnder Delay Interferometer (MZDI) 402, producing a time delay of 25 ps and multiples of pi/8 phase shifts. Thus, MZDI 402 produces a combination of two signals phase related according to a modulation of the signal. These two signals are separated by a 1×2 3 dB coupler and fed to silicon-germanium (SiGe) detectors, which convert the optical signals to electrical signals. A difference circuit forms the difference of the two electrical signals from the detectors to recover the I data stream. Similar circuitry is provided in the other branches to recover the Q and D data streams.

Thus, one embodiment is an integrated circuit for demodulating a modulated optical signal. The embodiment comprises a substrate upon which is constructed a pn junction with a depletion region there between to form an optical waveguide. A splitter construct over the substrate splits the optical waveguide into at least two branches. In each branch, an interferometer construct over the substrate produces a time delay and a phase shift equal to a multiple of a fraction of pi to produce a phase shifted signal and a reference signal. In each branch, a coupler receives the phase shifted signal and reference signal from the interferometer and provides each signal to a detector to produce two electrical signals. Difference circuitry takes the difference between the two electrical signals to recover an information data stream.

In some embodiments, the integrated receiver circuitry further comprises a combiner to combine the information data streams from two of the branches to produce a third information data stream. Also, the interferometer in a branch may be a Mach-Zehnder Delay Interferometer (MZDI). In one embodiment the splitter splits the optical waveguide into four branches. In one embodiment the fraction of pi implemented by the interferometer is one eighth.

Note that the proposed silicon integrated transmitter and receiver chip significantly simplifies the multilevel DPSK implementation. For example, the pi/2 phase shift for the transmitter and phase shift for the MZDIs in the receiver can be accurately designed and controlled with a silicon phase shifter. These slow phase shifters can be based on either thermo-optic effects or current injection effect in silicon. By combining WDM (Wave Division Multiplexer) technology with the 8-level DPSK scheme, one can achieve 1-10 Tb/s (Tera bits per second) capacity. For example, using 10 different wavelengths, one obtains 1.2 Tb/s.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. An integrated circuit for modulating a continuous wave laser, comprising:
   a substrate upon which is constructed a pn junction with a depletion region there between to form an optical waveguide;
   a splitter construct over the substrate to split the optical waveguide into at least two branches; and
   in each branch, a metallic construct over the substrate coupled to the pn junction to modulate optical phase of the laser coupled into the optical waveguide according to an electrical modulating signal comprising data to be transmitted applied to each metallic construct, the metallic construct in a branch to receive a signal modulated at a rate of at least about 40 Giga bits per second and thereby modulate an index of refraction of a segment of optical waveguide at a rate of at least about 40 Giga bits per second.

2. The integrated circuit of claim 1, wherein one branch exhibits a pi/2 phase shift with an optical path length longer than the other branch.

3. The integrated circuit of claim 1, further comprising a combiner construct over the substrate to combine the modulated optical signals from each branch into a single optical waveguide path.

4. The integrated circuit of claim 3, wherein the combiner combines two modulated signals to produce a combined signal that exhibits a modulation rate of at least about 80 Giga bits per second.

5. The integrated circuit of claim 3, further comprising a metallic construct over the substrate coupled to a pn junction forming an optical waveguide in the single path to modulate optical phase of the modulated optical beam according to an electrical modulating signal comprising data to be transmitted applied to the metallic construct over the substrate in the single path.

6. The integrated circuit of claim 5, wherein the metallic construct over the substrate in the single path is continuous with the metallic constructs over the substrate in the branches.

7. The integrated circuit of claim 5, wherein a signal is applied to the metallic construct in the single path to modulate an index of refraction of the path to produce further modulation at the rate of at least about 40 Giga bits per second to produce a signal that exhibits a modulation rate of at least about 120 Giga bits per second.

8. The integrated circuit of claim 1, further comprising, before the splitter construct, a metallic construct over the substrate to modulate optical phase of the laser according to an electrical modulating signal comprising data to be transmitted applied to the metallic construct before the signal being split into the two branches.

* * * * *